Figure 11:
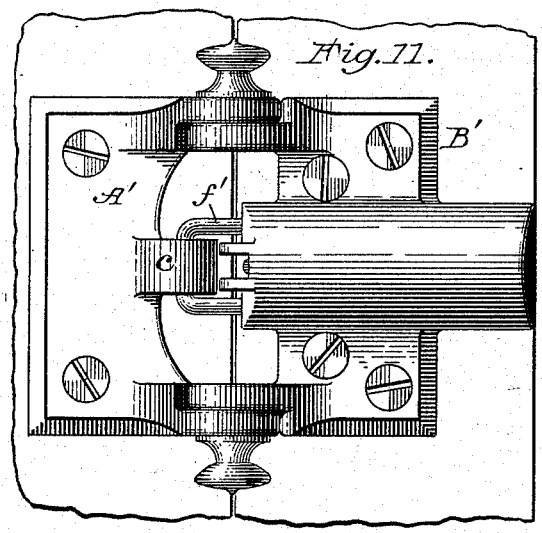

(No Model.) 3 Sheets—Sheet 1.
LE DRU R. POMEROY.
SPRING HINGE.
No. 518,626. Patented Apr. 24, 1894.
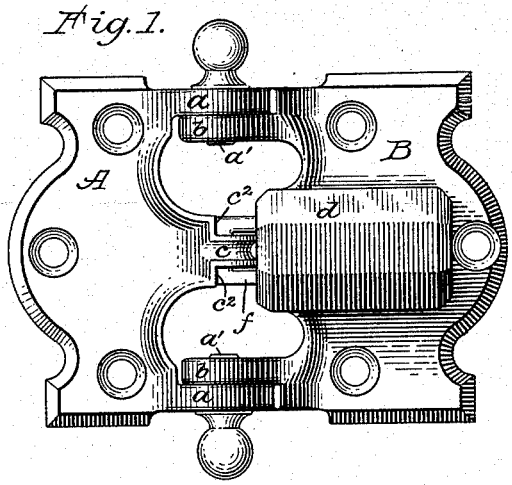
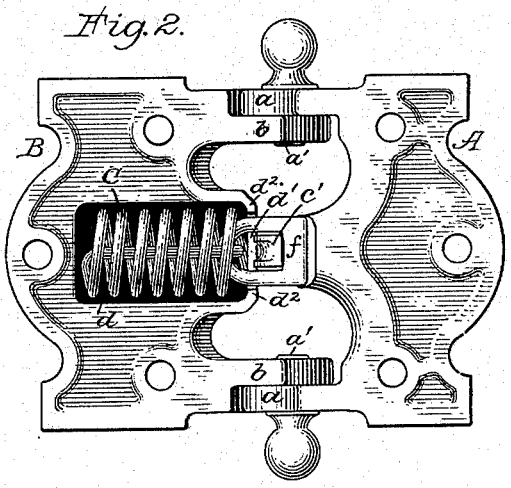
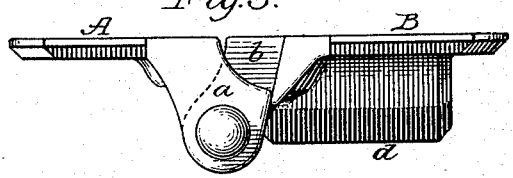
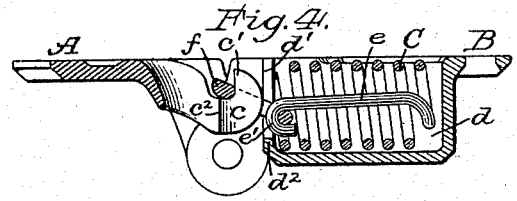
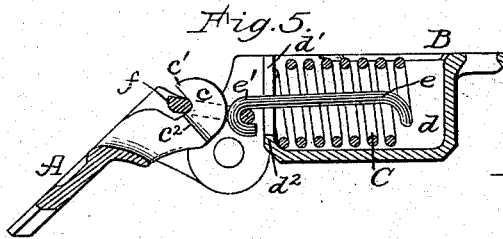
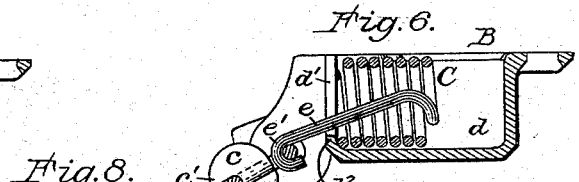
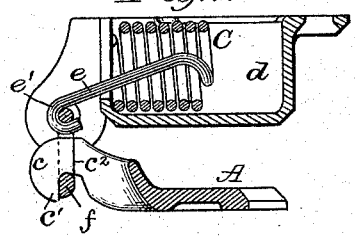
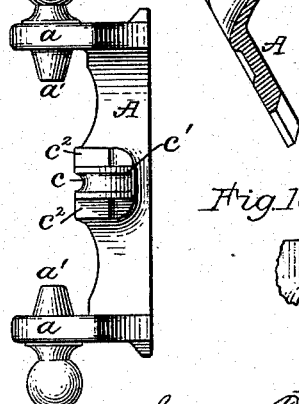
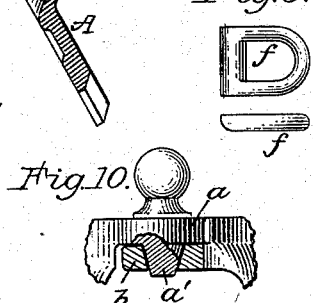
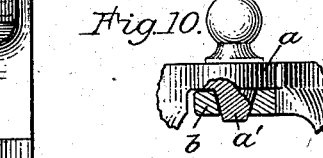
Attest:
Philip F. Larner
Nowell Hartle
Inventor:
Le Dru Robbin Pomeroy
By _____
Attorney (No Model.) 3 Sheets—Sheet 2.

LE DRU R. POMEROY.
SPRING HINGE.

No. 518,626. Patented Apr. 24, 1894.

Attest:
Philip F. Larner
Nowell Castle

Inventor:
Le Dru Rollin Pomeroy
By Wm C Ward
Attorneys

THE NATIONAL LITHOGRAPHING COMPANY,
WASHINGTON, D. C.

(No Model.)
LE DRU R. POMEROY.
SPRING HINGE.
No. 518,626. 3 Sheets—Sheet 3. Patented Apr. 24, 1894.
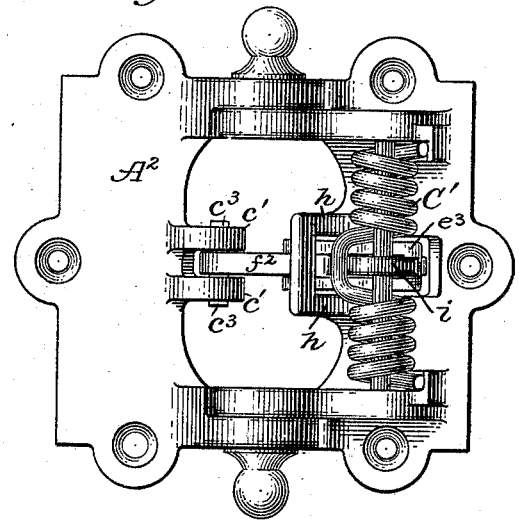
Fig. 19.
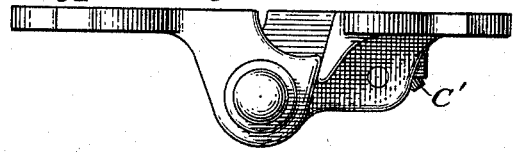
Fig. 20.
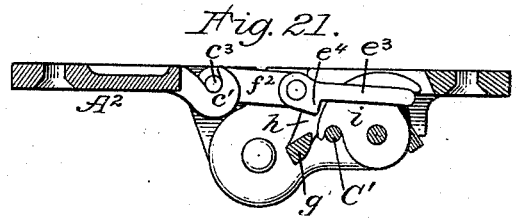
Fig. 21.
Fig. 22.
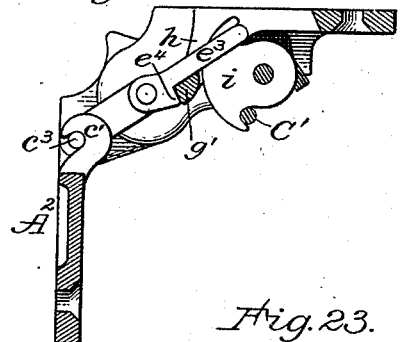
Fig. 23.
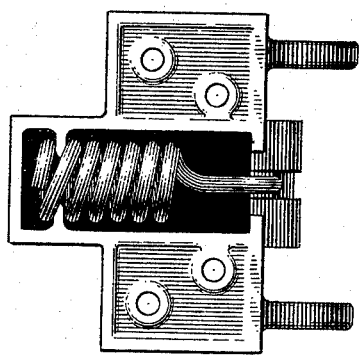
Fig. 25.
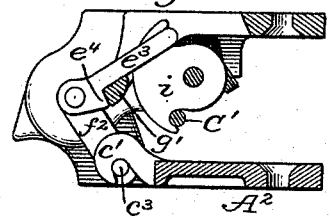
Fig. 24.
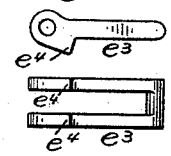
Fig. 26.
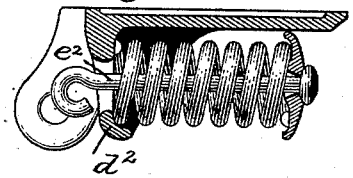
Fig. 27.
Attest:
Philip F. Larner
Nowell Bartle
Inventor:
Le Dru Rollin Pomeroy
By McNreil
Attorney

UNITED STATES PATENT OFFICE.

LE DRU ROLLIN POMEROY, OF CLEVELAND, OHIO, ASSIGNOR TO THE VAN WAGONER & WILLIAMS HARDWARE COMPANY, OF JERSEY CITY, NEW JERSEY.

SPRING-HINGE.

SPECIFICATION forming part of Letters Patent No. 518,626, dated April 24, 1894.

Application filed May 11, 1893. Serial No. 473,795. (No model.)

*To all whom it may concern:*

Be it known that I, LE DRU ROLLIN POMEROY, of Cleveland, in the county of Cuyahoga and State of Ohio, have invented certain new and useful Improvements in Spring-Hinges; and I do hereby declare that the following specification, taken in connection with the drawings furnished and forming a part thereof, is a clear, true, and complete description of my invention.

The main object of my invention, is to produce a spring hinge which can control a door only with respect of its closing movement, as with ordinary spring hinges, but which will nevertheless, leave the door as free to occupy and remain in, any desired rearward position, as it would be if the hinges had no springs. This capacity is especially desirable, as, for instance, when doors should be left open and against closely adjacent side walls, or when articles of furniture are closely adjacent to one side of a door, and against which it would be unsafe to throw the door, with liability of injury to the furniture, the door, or the screen netting of the door, or to both.

A spring hinge embodying the main feature of my invention, involves the novel mode of operation indicated, in that its spring, (regardless of its character or mode of exercising its force,) is subjected to appropriate tension during the opening movement of the hinge, and is then locked against any controlling action with relation to the movable leaf of the hinge, so that said leaf may then rest in any rearward position in which it may be placed. In other words, a door to which my spring hinges have been applied, can only be opened by putting the springs under tension, as with ordinary spring hinges, and when the door reaches a certain opening position or dead point, the springs will have been subjected to their full door controlling tension, but a further backward movement of the door, will cause the springs to be locked and rendered wholly inoperative, and therefore the door will be free to stand at rest at any point or angle say between ninety and one hundred and eighty degrees of its backward movement. This mode of operation, differs radically from that of the many so called "double acting" or "hold back" spring hinges, wherein a spring maintains its control over the movable leaf, (or a door,) during all of its swinging movement, except during the passage of the "dead point" at which the line of spring action bisects the pivotal line of the hinge, the spring, in all hold back of the hinge, continuing to exercise its control in forcibly throwing a door backwardly, this being frequently objectionable.

Another object of my invention, is to secure close but freely operative relations between the two leaves of the hinge at the pintles, and also to maintain such relations, regardless of wear of the contact surface at the door supporting ear; and, still further, to economize in the matter of construction, and assembling, these ends being attained by employing tapered hinged pivots, integral with their ears, and integral eye ears co-operating therewith, so that the hinge leaves are inseparable.

To more particularly describe my invention, I will refer to the accompanying drawings, in which—

Figure 12:
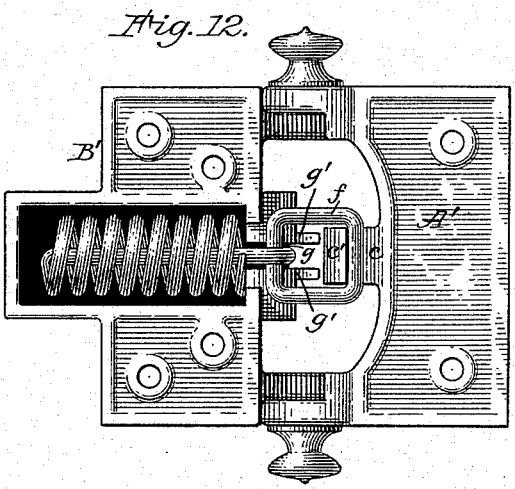
Figure 13:
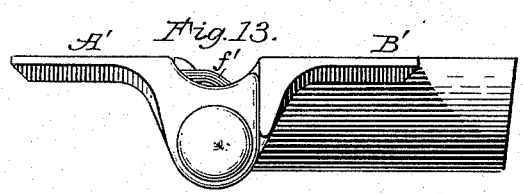
Figure 14:
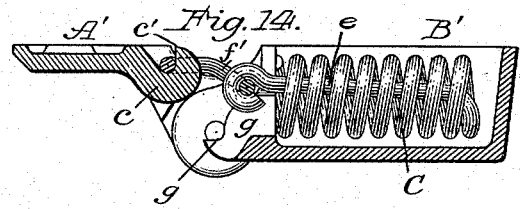
Figure 15:
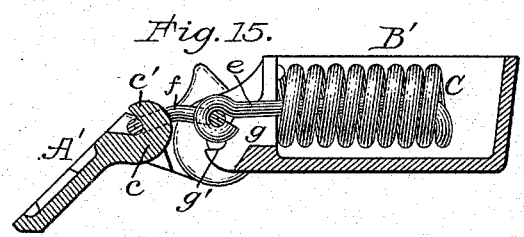
Figure 16:
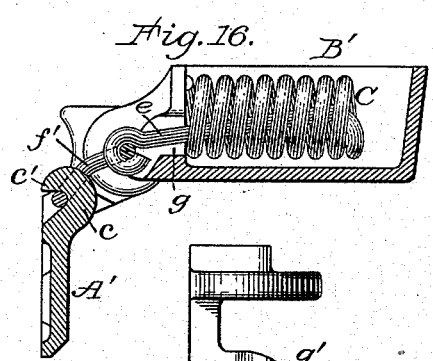
Figure 17:
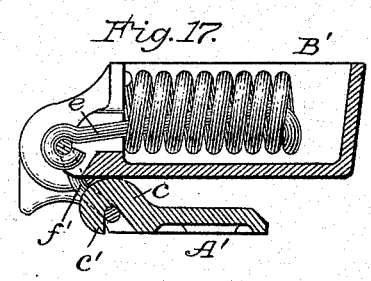
Figure 18:
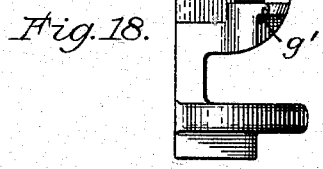

Figure 1, illustrates one of my hinges in an approved form, in front view, as when mounted on a frame and door. Fig. 2, illustrates said hinge, in rear view. Fig. 3, illustrates said hinge in side or edge view. Fig. 4, illustrates the same in central section, at right angles to the axis of the hinge. Figs. 5, 6, and 7, are similar sectional views of said hinge, showing it, respectively, in a partly opened position, at the dead point, and as when a door has been thrown backward against a wall, and the spring locked against exerting closing strain. Fig. 8, is a view of the inner edge of one of the hinge leaves. Fig. 9, illustrates the link, by means of which, the one hinge leaf is coupled to the spring, carried by the other leaf. Fig. 10, is a sectional view of one pair of the hinge ears, on the pivot line. Fig. 11, illustrates one of my hinges in front view, as when mounted on a door and its frame. Fig. 12, is a rear view of the hinge. Fig. 13, illustrates the same in end view. Fig. 14, illustrates the hinge in central lateral section, and in its closed position. Fig. 15, illustrates the same with the movable leaf in the outward position, which it would usually be made to occupy during the ordinary opening of a door, the latter being still under the control of the spring. Fig. 16, illustrates the same, as when the spring is locked, leaving the door free to rest at any desired point between the position shown, and the full rearward position. Fig. 17, is a view of the hinge as when one leaf, or a door, is in its most rearward position. Fig. 18, is a view of the inner end of the spring chamber, without the spring rod and link. Figs. 19—20, and 21, in front view, end view, and lateral central section, illustrate one of my hinges, in which the springs are parallel with the hinge axis, and are torsionally strained, as distinguished from the longitudinal straining involved in the operation of transversely arranged springs. Figs. 22 and 23, illustrate said hinge, respectively opened to its dead point, and to its full rearward position. Fig. 24, in two views illustrates the spring rod of said hinge. Fig. 25, illustrates in rear view a leaf of one of my hinges, with a spring arranged to operate retractively and having an integral spring rod. Fig. 26, illustrates in section, a leaf of one of my hinges provided with a headed spring rod, and a disk for coupling the rod to the spring. Fig. 27, illustrates a modification of the link, for use with a stop rod, similar to that in the hinge Figs. 22 to 24 inclusive.

The leaves A and B, of my hinge, may be widely varied in their character, provided they have appropriately projecting ears, connected in pairs, and afford the required intermediate space.

Referring to the hinge illustrated in Figs. 1 to 10, it will be seen that the leaves A and B have the usual outwardly projecting ears and these, without departure from the main features of my present invention, may be hinged, either by means of the usual short inserted pintles, or upon the open ear plan, or with integral pintles, upon which the co-operating ears are integrally cast, this latter construction as shown constituting one portion of my present invention, which is applicable to other forms of hinges. The leaf A, has an integral ear $a$, having an integral pintle $a'$, which is conical or quite sharply tapered from its end to the ear, as clearly indicated in Fig. 10. This leaf A, is first cast, and then by means of a suitable mold, the leaf B, is cast, so that its ears $b$, are integrally formed upon and around the integral tapered pintles. Broadly considered, this mode of casting hinges is not new, and this portion of my invention consists, in a pair of hinge leaves, one having integral ears, provided with integral conical or tapered pivots, and the other leaf having ears which are also integral, have tapered eyes, and are inseparably united to the ears which have said integral tapered pivots. The tapered integral pivots, constitute the essential feature of this portion of my invention, in that they afford a very strong free hinge joint, and at a minimum of cost. If said pivots should be straight, instead of tapered, the integral ears $b$, would be so tightly set upon the pivots, as to defeat the desired hinging effect, but the pintles being tapered, the cold shrinking of the metal on the leaf B, causes the eye ears $b$, to be moved slightly toward each other upon the tapered pintles, thus loosening the inclosing contact, and affording not only free hinge joints, but joints which operate smoothly, and with a minimum capacity for movement by the leaves independently of each other in the line of the pivots. These integral tapered pivots, with co-operating integral eye ears, have special value in spring hinges, which do not require a long pivot rod, common to both sets of ears, and also in any hinge which is to carry its portion of the weight of a door, upon one of its ears, because of the fact that during the wear of the coincident ear surfaces, the surfaces of the tapered pintle, and the coincident inclined or tapered surfaces of the pintle eye, will continue to maintain their normal close relations. The leaf A, at a central position between the ears $a$, $a$, has a laterally projecting lug at $c$, which affords a hook at $c'$, on its under side, and also at each side of said hook, a spring locking stop shoulder, as at $c^2$, $c^2$. The outer surface or edge of the hook portion of the lug, is concaved, merely for affording space for a portion of the adjacent end of a spring rod, as will hereinafter be made apparent. The leaf B, of this hinge, has on its outer side, a transverse spring holding chamber $d$, open at its rear side, closed at its outer end, and open at its inner end, as at $d'$, but having at each side of and above said opening an interior shoulder $d^2$, which serves as an abutment for the adjacent end of a spiral spring C. This abutment is only required in connection with a spring which exerts its power at the end, farthest from the inner end of the chamber, as is the case with the spring shown. This spring C, is integral with its spring rod $e$, the latter being a prolongation of the spring wire, abruptly bent, and extended centrally to the opposite end, where it is provided with a hook or eye $e'$. A spring rod in some form is essential, and although here shown to be integral with the spring, and the spring so arranged that it operates expansively, it will be obvious that said rod would be much shorter if the opposite end of the spring afforded the rod, and the spring was arranged to operate retractively, and had one end thereof secured at the outer end of the chamber, as illustrated in Fig. 25. As shown in Fig. 26, a separately constructed spring rod $e^2$, having a head at its end for engaging with a disk abutting against the end of the spring, may also be employed, in which case no spring chamber will be required, although the hinge leaf is provided with a spring abutment as at $d^2$. It will of course be understood, that variations in the character of the spring, and its rod, need involve no departure from my invention, but in all cases, the spring rod must be flexibly coupled with the opposite hinge leaf by way of a suitable link, because during a portion of the swinging movement, the spring, by way of its rod, is so locked that no spring force can be exerted upon said other leaf, and during that time, the connection between the link and said rod must be located and held in line with the hinge axis.

In this hinge, the link $f$, shown separately in Fig. 9, is rounded at one end, and substantially rectangular at the other, and its round end is engaged by the spring rod hook or eye $e'$, and at its other end, said link engages with the hook $c'$, of the lug $c$, on the hinge leaf A. When the hinge is in its closed position, as shown in Figs. 1 to 4 inclusive, the draft of the spring with respect of the two hinge leaves is the same as in all spring hinges, the line of draft being in a plane between the planes of the leaves, and the hinge or pintle line; and as usual in other spring hinges, the closing action of the spring is exercised, as illustrated in Fig. 5, and as in all "hold back" spring hinges, the closing action of the spring ceases when the dead point is reached, as illustrated in Fig. 6, the link and the spring rod then being in line with each other, and crossing the axial line of the hinge.

Unlike any "hold back" spring hinge, and also unlike any prior spring hinge known to me, my hinge is absolutely freed from the controlling action of the spring, after the dead point is passed; i. e., during all backward movement of a door, beyond the position indicated in Fig. 6, so that when, as shown in Fig. 7, the door has been swung fully rearward, or to any intermediate point, the spring will be locked against any controlling influence. In this hinge the spring locking effect, is accomplished by the stop, afforded by the shoulders $c^2$, $c^2$, with which the sides of the link $f$, abut or engage, so that, after passing from the dead point position Fig. 6, the link has no swiveling action independently of the leaf A, and therefore the hinged, or pivotal connection of the link with the spring rod, is held or maintained, in line with the hinge axis. The spring locking stop thus operating, enables a door to remain securely at rest at any desired angle between the dead point position and the extreme rearward position, and obviates the backward slamming of a door, as with "hold back" hinges, wherein the springs operate with equal force, both in throwing a door to its closed, and to its backward position. The release of the spring from the locking stop, involves the exercise of sufficient force to ordinarily prevent a door from being swung from its rearward position (by the wind, for instance,) into the position at which the spring can exert its closing force.

It is to be understood, that it is quite immaterial where the spring locking stop may be located, so long as it serves to locate and to maintain the pivotal connection of the rod and link substantially in line with the hinge axis; as, for instance, with the variation embodied in the hinge illustrated in Figs. 11 to 18. In this hinge, the leaf A', has a lug $c$, and a hook $c'$, but the locking stop or stop shoulders, are not on said lug, as in the hinge previously described. This hinge leaf B', has a spring, and a spring rod $e$, substantially as already described, but this link $f'$, is rectangular, and slightly bent longitudinally, because the hook lug $c$, $c'$, is located nearer to the plane of the hinge leaf A', than the hook in the other hinge. The inner end of the spring chamber, as specially shown in Fig. 18, is provided with a slot at $g$, on each side of which there are stop shoulders at $g'$, $g'$, clearly shown in Figs. 14, 15, and 18. These shoulders are beneath and partly afforded by projecting spurs, which are shown fully in Figs. 11 and 12. These spurs, aside from those portions thereof which afford the locking stop shoulder or shoulders, are of little if any consequence, because the sides and top of the slot $g$, serve to restrict the end of the spring rod $e$, as to its proper location and range of movement, and as a matter of fact, the spring rod might engage with the surface of the metal adjacent to the end of the slot $g$, and enable said surface to operate as the spring locking stop or shoulder, as will hereinafter be made fully apparent.

It will be seen, that the operation of this hinge is the same as that previously described. In passing from the closed position Fig. 14, to the ordinarily opened position, as for instance between the position shown in Figs. 15 and 16, the hinge will operate in closing a door, like any ordinary spring hinge, but after the door passes rearwardly from the dead point position, of Fig. 16, the spring exerts no force whatever on a door, because it is then locked by the stop, thus leaving the door free to occupy, and to remain in any position, between that shown in Fig. 16, and that of Fig. 17.

It is now to be understood, that hinges involving my invention are not restricted to such as embody longitudinally operating and transversely arranged springs; as for instance, the hinge illustrated in Figs. 19, to 24, inclusive, has a torsionally operating spiral spring, which is parallel with the axial line of the hinge. This hinge has no spring chamber, although the spring may be housed if desired, but its housing could not afford a locking stop shoulder, as in the hinge Fig. 11. In this hinge, the stop shoulder $g'$ is afforded by a standard or lug $n$, on the leaf B², said lug in this respect, being like the inner end of the spring chamber of the hinge Fig. 11, but of course performing no spring abutment duty. This spiral spring C', is complex, in that it is double, or in two sections, but formed from one length of wire, so that an intermediate portion thereof serves as a loop for connecting the double spring, to a rotative hub $i$, preferably mounted upon a central rod within the spring, and having a hook which is engaged by the spring. This hub has also a second hook, with which one end of the spring rod $e^3$, is engaged, the opposite end of said rod being hinged or pivoted to the link $f^2$, which is in turn connected with the leaf $A^2$, by means of a double hook at $c'$ and a cross pin $c^3$ as clearly indicated. This spring rod $e^3$, is double, as shown in Fig. 24, and has a pair of hooks $e^4$. It will be obvious, that with this form of spring, the hub $i$, serves merely as a means for operatively coupling the spring rod $e^3$, to the spring, the same as with the disk and the rod $e^2$ of Fig. 26, and also the same as with that lateral or radial portion of the spring wire which connects the straight rod portion $e$, with the terminal coil of the spring, as in the hinges Figs. 1 to 17 and 25. This hinge, when on its "dead point," Fig. 22, has its stop hooks $e^4$, in contact with the stop shoulder $g'$, thus locking the spring, and locating the hinge connection of the link and rod in line with the axis of the spring, so that the leaf or a door, may be swung rearwardly to the full rearward position shown in Fig. 23, or allow the door to occupy and remain in, any intermediate position. It will also be obvious, that the spring locking stop, in each of the three instances illustrated, operates solely for locking the spring, after passing the dead point, and hence it is immaterial how this is accomplished, provided that the flexible pivotal or hinged connection between the spring rod and the link, is located and held substantially in line with the hinge axis, by said stop, while the spring is locked, and during the rearward movement of a door, beyond the dead point; and it will be further obvious, that the same mode of operation is involved, regardless as to which leaf may carry the stop shoulder, or whether the shoulder be single or double, or whether said shoulder is engaged by the spring rod, or by one end of the link, or by either or both of its sides. It will be still further obvious, that all of these variations in the form of the locking stop, might be embodied in one hinge, in which case they would all co-operate as one spring locking stop, because neither of the forms could perform any spring controlling function, independently of the others, and hence all but any one of them, would involve mere surplusage.

In organizations wherein the stop shoulder is located on the spring carrying leaf as described, and when the spring rod is provided with a co-operating surface or catch, the location of the pivotal connection between the rod and the link may, if desired, be located without special reference to the axial line of the hinge. As illustrated in Fig. 27, the link $f^3$, is flexibly constructed, in two parts, after the manner of a chain, so as to enable it to be self adjusting with reference to the axial line of the hinge, after the operation of the spring locking stop. This spring rod and any flexible link, could be applied to the hinge Fig. 19, and although when the hinge was in the position shown in Fig. 23, with the spring locked, the pintle hole in the rod would be located at the one side of the axial line of the hinge, the link being flexible, would enable the action of the hinge to be as free, as when the said pintle hole is located exactly in line with the hinge axis, and it will be obvious that the locking and the freeing of the spring would be performed as perfectly, as with an inflexible link, although the latter has special value because it securely holds the spring rod in its locked position; and it will be equally obvious that the spring rod may also be flexible inasmuch as it performs no thrusting duty.

Having thus described my invention, I claim as new and desire to secure by Letters Patent—

1. In a spring hinge, the combination substantially as hereinbefore described, of a pair of hinge leaves having appropriately projecting ears; a spring mounted on one of said leaves, and coupled to the other leaf, and a spring locking stop, which restricts the spring to closing duty, whereby after the hinge has been opened with the spring under tension, a further movement of either leaf, will cause the spring to be locked and rendered inoperative, and permit the movable leaf to be placed, and to remain in, any desired rearward position.

2. In a spring hinge, the combination substantially as hereinbefore described, of a pair of hinge leaves having appropriately projecting ears; a spiral spring transversely mounted on one of said leaves, and provided with a spring rod extending toward the other leaf; a link which is pivotally connected to the outer end of said rod, and also to said other leaf; and a spring locking stop which holds said rod and limits the action of the spring to door closing duty, and locates the pivotal connection of the link and rod adjacent to the line of the hinge axis, for enabling the door carrying leaf of the hinge to occupy any desired rearward position, free from control by the spring.

3. The combination of a pair of inseparable cast metal hinge leaves, one leaf having projecting ears, provided with integral tapered or conical pivots, and the other leaf having similarly integral projecting ears provided with correspondingly tapered eyes, inseparably occupied by the tapered pivots, substantially as described.

LE DRU ROLLIN POMEROY.

Witnesses:
N. L. POST,
C. J. MARKHAM.